United States Patent Office 3,398,153
Patented Aug. 20, 1968

3,398,153
NAPHTH[2,3-b]INDOLIZINE-6,11-DIONES
Eric Richard Inman, Renfrewshire, Hugh Macdonald Smith, Glasgow, and Ian Alexander Macpherson, Renfrewshire, Scotland, assignors to J. R. Geigy A.G., Basel, Switzerland
No Drawing. Continuation-in-part of application Ser. No. 436,282, Mar. 1, 1965. This application Oct. 12, 1965, Ser. No. 495,299
Claims priority, application Great Britain, Feb. 28, 1964, 8,323/64
5 Claims. (Cl. 260—294.9)

ABSTRACT OF THE DISCLOSURE

Colored compounds of the formula

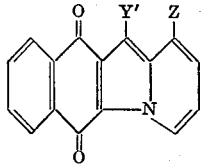

wherein Y' represents one of the radicals —CN, —CO—X', —CO—OX' and —CO—NH—X''; X' being lower alkyl and X'' being H, monocarbocyclic aryl or naphthyl, and Z being hydroxy or amino, and are useful in the preparation of heterocyclic dye-stuffs, as intermediates in the production of other heterocyclic organic compounds, etc., and as pigments for color-pigmenting materials such as polyvinyl chloride as well as for coloring stoving lacquer, with resultant excellent fastness properties.

The said colored compounds are prepared by condensing (a) 2,3-dihalogen-1,4-naphthoquinone compound with (b) a reactive methylene compound, and with (c) either 3-hydroxy-pyridine or 3-amino-pyridine, to produce a 1-hydroxy- or a 1-amino-substituted naphthindolizinedione, respectively, by heating a mixture of the three reactants, preferably in an inert organic solvent, such as ethanol, quinoline or mixtures thereof and then recovering the resulting 1-hydroxy- or 1-amino-substituted naphthindolizinedione from the reaction mixture. Preferably the process is carried out at a temperature above 50° C. and up to the reflux temperature of the reaction mixture.

This application is a continuation-in-part of copending application Ser. No. 436,282, filed Mar. 1, 1965, now abandoned.

According to the present invention, a process of producing a substituted naphthindolizinedione comprises condensing:

(a) a 2,3-dihalo-1,4-naphthoquinone compound having the formula

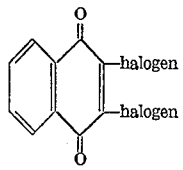

with (b) a reactive methylene compound as defined further below, and
with (c) either 3- hydroxy-pyridine or 3-amino-pyridine, to produce a 1-hydroxy- or a 1-amino-substituted naphthindolizinedione, respectively, by heating a mixture of the three reactants, preferably in an inert organic solvent, such as ethanol, quinoline or mixtures thereof and then recovering the resulting 1-hydroxy- or 1-amino-substituted naphthindolizinedione from the reaction mixture. Preferably the process is carried out at a temperature above 50° C. and up to the reflux temperature of the reaction mixture.

Throughout the specification and claims, the term "lower" signifies a group containing not more than five carbon atoms when used in connection with an aliphatic radical.

The halogens of the substituents in the 2,3-dihalo-1,4-naphthoquinone compound may be different but are advantageously the same and may be for example chlorine or bromine. 2,3-dichloro-1,4-naphthoquinone is a preferred reactant.

The reactive methylene compound falls under one of the formulas $$X—CO—CH_2—Y \quad (II)$$
$$X—O—CO—CH_2—CN \quad (IIA)$$

wherein the moiety X is lower alkyl,

Y represents either —CO—X', —CO.O—X' or
—CO—NH—X''

X' being lower alkyl, and
X'' being H, monocarbocyclic aryl or naphthyl, all of which groups represented by X' and X'' are also defined more in detail below.

The moiety X of compounds falling under Formulas II and IIA should also be free from substitution leading to reaction with the other reactants, under the conditions of the process according to the invention.

In the above-given definition of X'', monocarbocyclic aryl means either unsubstituted phenyl or phenyl substituted as defined hereinafter.

The substitution of the above-mentioned phenyl radical consists of non-functional groups which do not react with the other reactants and especially not with oxygen and chlorine atoms present in the 2,3-dichloro-naphthoquinone reactant under the above-described conditions prevailing in the process according to the invention. Such substituents are lower alkyl, lower alkoxy, chlorine, bromine, lower alkyl-sulfonyl and lower akyl-substituted sulfamyl.

Preferred reactive methylene compounds for use in the process according to the invention are those of the above Formula II in which Y represents —CO—X', or —CO.O—X' and X and X' are identical radicals.

Good results are obtained in the process according to the invention when using methylene compounds of Formula II in which Y represents —CONHX'', and X'' represents phenyl, naphthyl or phenyl substituted by the following:

Lower alkyl, lower alkoxy, chlorine, bromine, lower alkyl-sulfonyl, lower alkyl-substituted sulfamyl.

The reactive methylene compound may be, for example, an acetoacetate, a β-diketone, a cyanoacetate, an acetoacetarylamide or a phthaloyl bis acetamide. Other compounds containing a reactive methylene group falling under Formula II may be used as reactant in the process according to the invention, the choice of any particular reactive methylene compound depending on the nature of the substituent desired in the 12-position of the naphthindolizinedione.

If, for instance, the desired 12-substituent is to be carboxylic ester group —COOR, wherein R is an alkyl group, the reactive methylene compound used as reactant is the corresponding acetoacetate $CH_3CO—CH_2—COOR$.

If the desired 12-substituent is to be an acyl group —COR where R has the previous significance, the reactive methylene compound should be the corresponding β-diketone, e.g. R—CO—CH₂—COR.

If the desired 12-substituent is to be a nitrile group, the reactive methylene compound used as reactant is an alkyl cyanoacetate.

If the desired 12-substituent is to be an anilide group —CO—NH—C₆H₅, the benzene ring of which is unsubstituted or substituted with one or more halogen or alkyl groups, the reactive methylene compound used as reactant is the corresponding acetoacetanilide.

If the desired substituent is to be a phthaloyl residue linking the naphthindolizinedione residue at the 12-position to a second naphthindolizinedione residue at the 12-position, the reactive methylene compound used as reactant is a phthaloyl bisacetamide, for instance the terephthaloyl bisacetamide.

If the desired naphthindolizinedione is to be a hydroxy-substituted naphthindolizinedione, the pyridine reactant used is 3-hydroxy-pyridine, whereas if the desired naphthindolizinedione is to be an amino-substituted naphthindolizinedione, the reactant is 3-amino-pyridine.

It is particularly surprising that this reaction proceeds without any detectable reaction between the amino or hydroxy group of the pyridine reactant with the halogen of the naphthoquinone; not only is it surprising that the reaction according to the invention proceeds without this complication but it has been found that the reaction goes smoothly with no or little detectable byproduct being formed and that the desired 1-amino- or 1-hydroxy-substituted naphthindolizinedione is obtained in the reaction mixture in readily separable form.

The aminopyridine or hydroxypyridine reactant should preferably be present in the starting mixture in sufficient amount to impart to the latter basic reactivity.

The process may be exemplified by the following reaction scheme, in which X has the previously expressed significance and Z means hydroxy or amino:

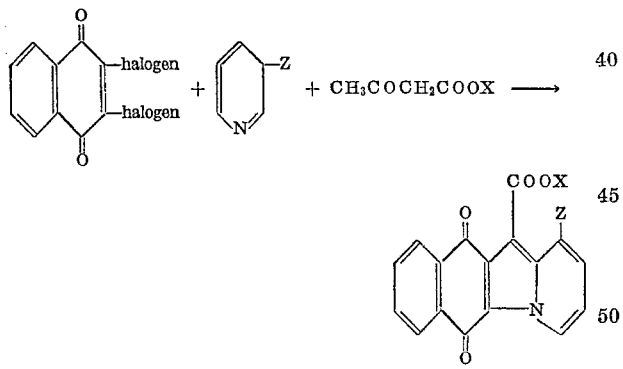

This reaction scheme illustrates the case where the reactive methylene compound is an acetoacetate.

The process according to the invention is carried out by mixing the 2,3-dihalo-1,4-naphthoquinone compound, the reactive methylene compound and 3-hydroxy- or 3-aminopyridine together, preferably in the presence of a solvent substantially inert under the conditions of the reaction, for example ethanol, methoxyethanol or ethoxyethanol. Preferably this mixture is maintained at an elevated temperature to effect the desired reaction and is best maintained at a temperature in the range of from 50° C. to the boiling point under reflux conditions as stated hereinbefore. The condensation may be carried out, for instance, by using an excess of the pyridine reactant over the reactive methylene compound or by using substantially stoichiometric proportions of these reactants.

The reaction product is recovered and, if desired, purified by conventional means, for instance by filtration and crystallization. The purified naphthindolizinedione is isolated or, if the product is required as an intermediate for further chemical reaction, the crude naphthindolizinedione is recovered for such use, if desired, after partial purification.

The substituted naphthindolizinediones of the invention are colored compounds of the formula

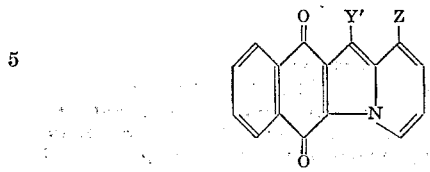

wherein Y' represents one of the radicals —CN, —CO—X', —CO—OX' and —CO—NH—X''; X' and X'' having the above-given meanings, and Z represents hydroxy or amino, and are for instance, useful in the preparation of heterocyclic dyestuffs, as intermediates in the production of other heterocyclic organic compounds, etc., and as pigments for color-pigmenting materials such as polyvinyl chloride as well as for coloring stoving lacquer, with resultant excellent fastness properties.

The following non-limitative examples further illustrate the present invention. Parts and percentages are expressed by weight unless otherwise stated. Parts by weight shown therein bear the same relation to parts by volume as do kilograms to liters.

Example 1

(a) 4.8 parts of 2,3 - dichloro-1,4-naphthoquinone, 3.9 parts of ethyl acetoacetate and 5.6 parts of 3-aminopyridine are suspended in 50 parts by volume of ethanol and the mixture is stirred and boiled under reflux for 1 hour.

On cooling the resulting product, 3.6 parts of 1-amino-12-carbethoxy-naphthindolizinedione having the formula

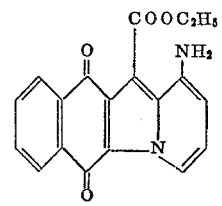

is obtained by filtering, washing with cold ethanol and drying. The product is a dark, micro-crystalline powder having melting point 171° to 173° C.

Similar results are obtained when the reaction is carried out in the same amount of methoxyethanol or ethoxyethanol as the solvent, in lieu of ethanol.

Correspondingly substituted 1-amino-naphthindolizinediones are obtained by repeating the above example, but using in lieu of 2,3 - dichloro - 1,4-naphthoquinone an equivalent amount of 2,3-dibromo-1,4-naphthoquinone.

Example 2

10.8 parts of 2,3-dichloro-1,4-naphthoquinone, 8.8 parts of ethyl acetoacetate and 12.9 parts of 3-hydroxypyridine are suspended in 60 parts by volume of ethanol. The mixture is stirred and boiled under reflux for 30 minutes. The resulting thick suspension is cooled to room temperature and the product is then filtered off, washed with cool ethanol and dried.

8.5 parts of 1 - hydroxy - 12-carbethoxy-naphthindolizinedione are thus obtained as a dull red, crystalline powder, having melting point 192° to 193° C., readily soluble in cold aqueous alkali to give a blue solution.

The compound produced has the formula

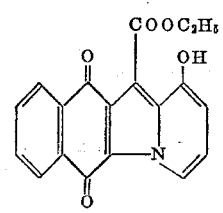

The same substituted 1-hydroxy-naphthindolizinedione is obtained by repeating Example 2, but using in lieu of the starting naphthoquinone used therein, an equivalent amount of 2,3-dibromo-1,4-naphthoquinone.

Example 3

The procedure described in Example 2 is carried out using methyl acetoacetate instead of ethyl acetoacetate as the reactive methylene compound.

The resulting product is 1-hydroxy-12-carbomethoxy-naphthindolizinedione having the formula

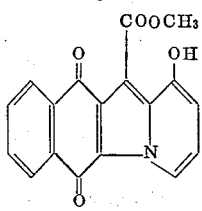

The product is a red-brown, needle-shaped crystalline compound having melting point 248° to 250° C. The yield is about 50% of the theory.

Example 4

The procedure described in Example 1 is carried out using methyl acetoacetate instead of ethyl acetoacetate as the reactive methylene compound.

The resulting product is 1 - amino-12-carbomethoxy-naphthindolizinedione having the formula

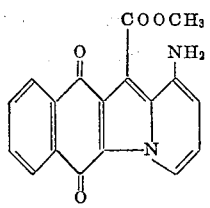

The product is a red-black, crystalline compound having melting point 218° to 219° C. The yield is about 60% of the theory.

Example 5

The procedure described in Example 2 is carried out using acetylacetone instead of ethyl acetoacetate as the reactive methylene compound.

The product obtained is 1-hydroxy-12-acetylnaphthindolizinedione having the formula

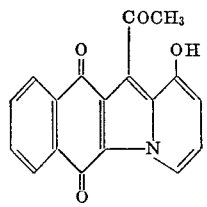

The product is a red-brown, needle-shaped crystalline compound having melting point 228° to 229° C. The yield is about 45% of the theory.

Example 6

The procedure described in Example 1 is carried out using acetylacetone instead of ethyl acetoacetate as the reactive methylene compound.

The resulting product is 1-amino - 12 - acetylnaphthindolizinedione having the formula

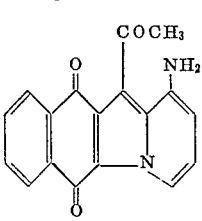

The product is a dark violet needle-shaped crystalline compound having melting point 225° C. The yield is about 60% of the theory.

Example 7

The procedure described in Example 2 is carried out using an equivalent amount of ethyl cyanoacetate as the reactive methylene compound in lieu of ethyl acetoacetate.

The product, obtained in about 55% theoretical yield, is 1-hydroxy-12-cyano-naphthindolizinedione having the formula

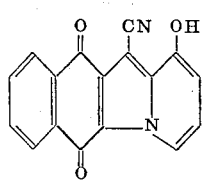

which is a dull crimson solid having melting point above 300° C.

Example 8

The procedure described in Example 1 is carried out using an equivalent amount of ethyl cyanoacetate as the reactive methylene compound in lieu of ethyl acetoacetate.

The product, obtained in about 75% theoretical yield is 1-amino-12-cyano-naphthindolizinedione having the formula

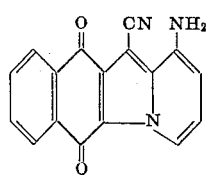

which is a dark red-violet, needle-shaped crystalline compound having melting point above 310° C.

Example 9

The procedure described in Example 2 is carried out using an equivalent amount of acetoacetanilide as the reactive methylene compound in lieu of ethyl acetoacetate.

The product, obtained in about 50% theoretical yield, has the formula

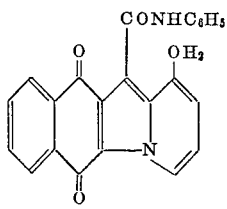

and is a violet, needle-shaped crystalline compound having melting point 287° to 288° C.

Example 10

The procedure described in Example 1 is carried out using an equivalent amount of acetoacetanilide as the reactive methylene compound in lieu of ethyl acetoacetate.

The product, obtained in about 40% theoretical yield, has the formula

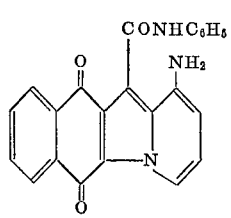

and is a black, plate-shaped crystalline compound having melting point 300° to 305° C. (with decomposition).

Other substituted 1-amino- and 1-hydroxy-naphthindolizinediones according to the invention are obtained by repeating Examples 9 and 10, respectively, but using, together with the 2,3-dihalo-naphthoquinones, equivalent amounts of the following arylamides of acetoacetic acid, in lieu of acetoacetanilide:

(a) acetoacetyl 4-chloroanilide,
(b) acetoacetyl 2,4-dimethylanilide,
(c) acetoacetyl 3-methoxyanilide,
(d) acetoacetyl 4-bromoanilide,
(e) acetoacetyl 4-ethoxyanilide,
(f) acetoacetyl 3-methylsulfonyl-anilide,
(g) acetoacetyl 3-N,N-dimethyl-sulfamyl-anilide,
(h) acetoacetyl naphthylamide.

The arylamides of acetoacetic acid used in the above example can be produced by known methods, e.g. by boiling acetoacetic ethyl ester with the correspondingly substituted arylamine in a high-boiling solvent (German Patent 256,621).

Example 11

95.6 parts of 2,3-dichloro-1,4-naphthoquinone, 63.7 parts of acetoacet-3,4,5-trichloranilide, 154.8 parts by volume of quinoline, 200 parts by volume of ethanol and 38 parts of 3-hydroxypyridine are stirred together at 75 to 80° C. for 1 hour. Filtration of the cooled mixture yields 88 parts of 3,4,5-trichloranilide of 1-hydroxynaphthindolizinedione-12-carboxylic acid, which upon recrystallization from nitrobenzene is obtained as violet needle-shaped crystals.

By replacing the 3-hydroxypyridine in the preceding paragraph by an equivalent amount of 3-aminopyridine and otherwise proceeding as there described, the corresponding 1-aminonaphthindolizinedione-12-carboxylamide is obtained in the form of dark needle-shaped crystals.

Either of the 3,4,5-trichloroanilides thus obtained can thereafter be milled with 9 times its weight of sodium acetate and sodium sulphate in xylene in per se conventional manner. The resultant pigment, after being isolated from the milling mixture, colors polyvinyl chloride and stoving lacquer bluish violet shades of excellent fastness properties.

Having thus disclosed the invention, what is claimed is:
1. 1-hydroxy-12-carbethoxy-naphthindolizinedione.
2. 1-hydroxy-12-carbomethoxy-naphthindolizinedione.
3. 1-hydroxy-12-acetyl-naphthindolizinedione.
4. 1-hydroxy-12-cyano-naphthindolizinedione.
5. 1-hydroxy - 12-N-phenyl-carbamyl-naphthindolizinedione.

References Cited

UNITED STATES PATENTS 2,773,873  12/1956  Randall et al. _____ 260—294.8 X
2,877,230  3/1959  Long et al. _____ 260—295

OTHER REFERENCES

Chem. Abstracts, vol. 56, par. 8888–i and 8889–a (1962).

Abstracting, Titkov et al., vol. 138, 682, U.S.S.R. (1962).

JOHN D. RANDOLPH, *Primary Examiner.*

A. L. ROTMAN, *Assistant Examiner.*